US008730632B2

(12) United States Patent
Moffett et al.

(10) Patent No.: US 8,730,632 B2
(45) Date of Patent: May 20, 2014

(54) POWER INTERCONNECT INTEGRITY DETECTION

(75) Inventors: Robert Moffett, Milton, MA (US); Scott Cooke, Townsend, MA (US)

(73) Assignee: Oracle International Corporation, Redwood City, CA (US)

( * ) Notice: Subject to any disclaimer, the term of this patent is extended or adjusted under 35 U.S.C. 154(b) by 144 days.

(21) Appl. No.: 13/606,466

(22) Filed: Sep. 7, 2012

(65) Prior Publication Data

US 2014/0071570 A1    Mar. 13, 2014

(51) Int. Cl.
*H02H 3/00*    (2006.01)
(52) U.S. Cl.
USPC ............................................................ 361/86
(58) Field of Classification Search
USPC ............................................................ 361/86
See application file for complete search history.

(56) References Cited

U.S. PATENT DOCUMENTS 6,194,877 B1 *    2/2001   Judge et al. ..................... 322/28

* cited by examiner

*Primary Examiner* — Rexford Barnie
*Assistant Examiner* — Tien Mai
(74) *Attorney, Agent, or Firm* — Marsh Fischmann & Breyfogle LLP; Daniel J. Sherwinter

(57) ABSTRACT

Embodiments include systems and methods for detecting and/or responding to deficiencies in power interconnect integrity. For example, a first module distributes power to a second module via a high-current mechanical power interconnect. Insufficient integrity in the interconnect can manifest as an impedance, causing potential thermal hazards. A separate (e.g., low-current) interconnect is used to monitor the power being received by the second module from the first module. Embodiments detect when a difference between the power supplied to and received by the second module exceeds a threshold difference, which can indicate deficient interconnect integrity (i.e., a fault). The supply of high-current power to the second module can be substantially immediately interrupted upon detecting the fault.

20 Claims, 3 Drawing Sheets

POWER INTERCONNECT INTEGRITY DETECTION

FIELD

Embodiments relate generally to power detection, and, more particularly, to power interconnect integrity detection.

BACKGROUND

Many computational systems distribute power across multiple subsystems. For example, main system power is provided to a motherboard, and the motherboard distributes appropriate power to multiple mezzanine boards or the like. Often power is distributed to the subsystems at high currents via conductive pads, bus bars and/or other suitable mechanical couplings which are secured using mechanical fasteners or other techniques. At the power levels being distributed, poor attachments can cause thermal hazards to the system. For example, a typical central processor unit (CPU) mezzanine board in a server system can draw approximately 300 Watts of power. A loose screw or other poor attachment in the power distribution coupling can add impedance to the system, resulting in thermal runaway. This type of thermal event can quickly cause damage to system components.

Some traditional systems include thermal monitoring for detecting these and/or other types of thermal hazards. However, undesirable thermal events often cannot be reliably detected until after thermal damage has already occurred. Accordingly, thermal monitoring may be insufficient to protect against thermal damage to system components resulting from mechanical integrity issues in power distribution.

BRIEF SUMMARY

Among other things, embodiments provide novel systems and methods for detecting and/or responding to deficiencies in power interconnect integrity. Embodiments operate in context of a first module providing power to a second module via a high-current mechanical coupling, like a conductive pad or bus bar. Insufficient integrity in the high-current mechanical coupling can manifest as an impedance, causing a voltage drop between the supplied level and the received level. A separate, low-current coupling (e.g., a dedicated pin of a ribbon connector or the like) is used to monitor the power level being received by the second module from the first module, such that the monitored (received) power level is lower than the supplied level when there is an issue with the power interconnect integrity (i.e., integrity of the high-current mechanical coupling). When the voltage drop exceeds a threshold amount, a fault is detected. The fault can be detected on a power and/or on a ground side of the power connection. In some embodiments, the supply of high-current power to the second module is substantially immediately interrupted upon detecting the fault.

According to one set of embodiments, a system disposed on a first circuit board of a computer system is provided for detecting a power interconnect fault between the first circuit board and a second circuit board of the computer system. The system includes: a module power output subsystem operable to provide a sourced power level from the first circuit board to the second circuit board via a board power interconnect coupling between the first circuit board and the second circuit board; a sense input port operable to receive a power sense signal from the second circuit board via a signal coupling that is physically separate from the board power interconnect coupling, the power sense signal indicating a received power level being received from the first circuit board by the second circuit board via the board power interconnect coupling; and a fault detection subsystem operable to generate a fault detect signal that indicates whether a difference between the sourced power level and the received power level is greater than a predetermined threshold level, wherein sourcing by the module power output subsystem of the module power from the first circuit board to the second circuit board via the board power interconnect coupling is interrupted substantially immediately upon receiving an indication via the fault detect signal that the difference between the sourced power level and the received power level is greater than the predetermined threshold level.

According to another set of embodiments, a method is provided for detecting a power interconnect fault. The method includes: determining a first power level being sourced from a first circuit board of a computer system to a second circuit board of the computer system via a board power interconnect coupling; monitoring, over a signal coupling that is physically separate from the board power interconnect coupling, a second power level being received from the first circuit board by the second circuit board via the board power interconnect coupling; and generating a fault detect signal operable to interrupt sourcing of the first power level from the first circuit board to the second circuit board via the board power interconnect coupling substantially immediately upon determining that a difference between the first power level and the second power level is greater than a predetermined threshold level.

According to yet another set of embodiments, another method is provided for detecting a power interconnect fault. The method includes: coupling a first circuit board with a second circuit board via a board power interconnect coupling; coupling the first circuit board with the second circuit board via a signal coupling that is physically separate from the board power interconnect coupling; sourcing a first power level at a high current from the first circuit board to the second circuit board via the board power interconnect coupling; monitoring, via the signal coupling at a low current, a second power level being received from the first circuit board by the second circuit board via the board power interconnect coupling; and interrupting sourcing the first power level at the high current from the first circuit board to the second circuit board via the board power interconnect coupling substantially immediately upon determining that a difference between the first power level and the second power level is greater than a predetermined threshold level.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
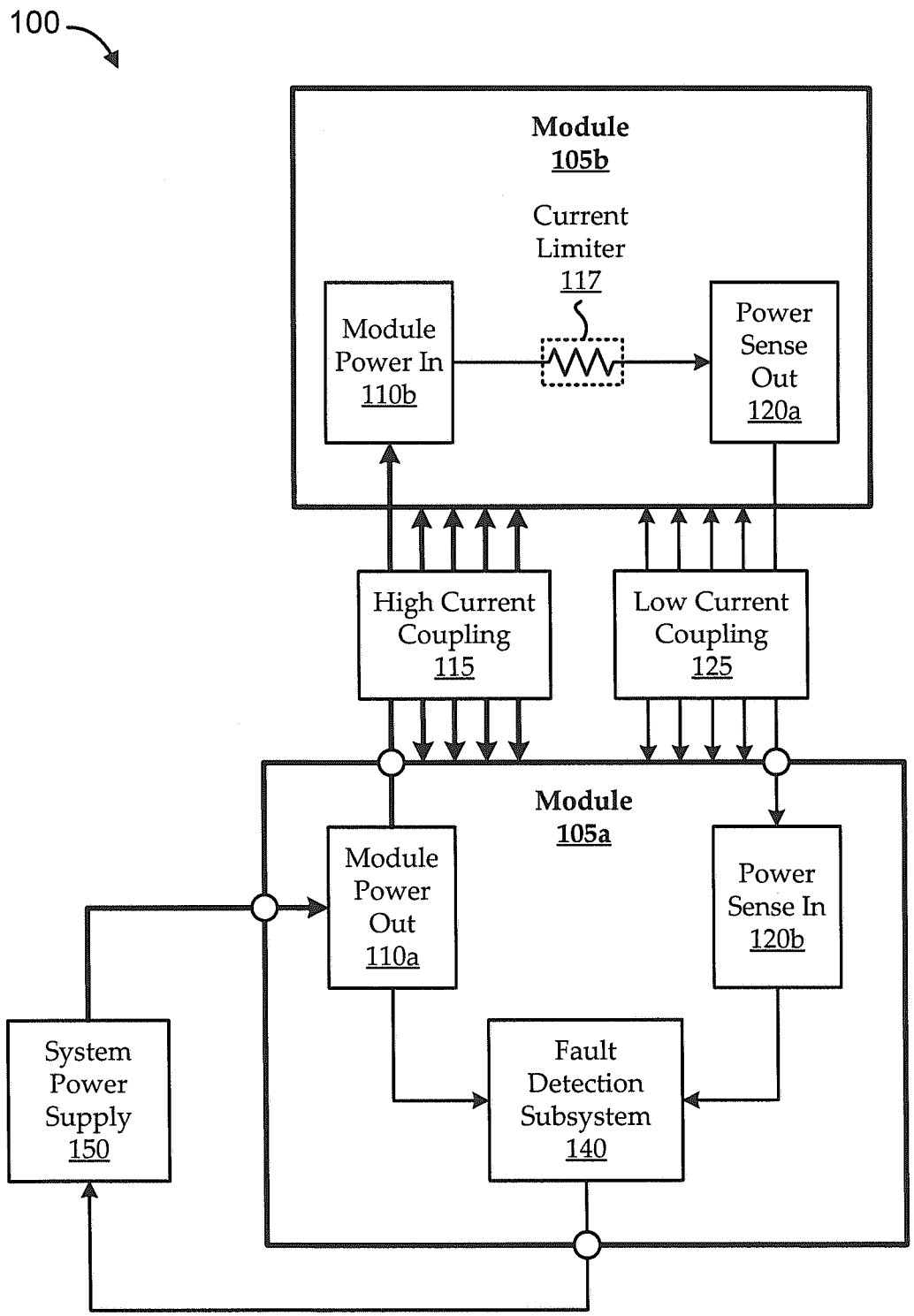
FIG. 1 shows a block diagram of an illustrative fault detection environment, according to various embodiments.

Turning first to FIG. 1, a block diagram is shown of an illustrative fault detection environment 100, according to various embodiments. The fault detection environment 100 includes a first module 105a and a second module 105b. The first module 105a supplies module power from a module power output subsystem 110a to a module power input subsystem 110b of the second module 105b over a high-current coupling 115. For example, the first module 105a is a main processor board (e.g., a motherboard), the second module 105b is a subordinate board (e.g., a mezzanine board), and the high current coupling 115 is a bus bar, conductive pad, or the like.

In some embodiments, the module power output subsystem 110a and the module power input subsystem 110b are respective sides (e.g., conductive pads) of the high-current coupling 115. In other embodiments, one or both of the module power output subsystem 110a or the module power input subsystem 110b provides additional functionality. For example, embodiments of the module power output subsystem 110a receive system power from a system power supply 150 and convert the system power into module power for distribution to the second module 105b.

When the high-current coupling 115 is of sufficient integrity, the power received by the second module 105b from the first module 105a is substantially equivalent to the power sourced by the first module 105a to the second module 105b. Insufficiency in the integrity of the high-current coupling 115 can manifest as impedance in the connection, which can cause a voltage drop between the supplied and received power on either side of the high-current coupling 115. Because of the high current, even a small voltage drop can cause the coupling 115 to dissipate appreciable power in the form of heat. The heat can build quickly (e.g., thermal runaway can occur), resulting in damage to system components.

For example, main system power is provided from the system power supply 150 to a motherboard, which distributes appropriate power to one or more central processor unit (CPU) mezzanine boards via bus bars secured by screws. Each CPU mezzanine board draws approximately 300 Watts of power (e.g., 20-25 Amps at 12-15 Volts). A loose screw, burned out bus bar, or other poor attachment manifests as an impedance in the coupling, resulting in thermal runaway and damage to system components. While some traditional systems include thermal monitoring, undesirable thermal events are often undetected until after thermal damage has already occurred. Accordingly, thermal monitoring may be insufficient to protect against thermal damage to system components resulting from mechanical integrity issues in power distribution.

Embodiments use a second, independent coupling 125 to monitor power (e.g., voltage and/or current) received by the second module 105b. As discussed above, any impedance manifesting from insufficient integrity in the high-current coupling 115 causes a voltage drop across the high-current coupling 115. Accordingly, a difference between the supplied and received voltages on either side of the high-current coupling 115 can indicate an insufficiency in the integrity of the high-current coupling 115.

Embodiments of the second module 105b include a power sense output subsystem 120a. The power sense output subsystem 120a is operable to generate a power sense signal that corresponds to the voltage received by the second module 105b over the high-current coupling 115. For example, the power sense signal can be at the same voltage level as that of the module power input subsystem 110b, the power sense signal can be generated as a function of the voltage level at the module power input subsystem 110b, the power sense signal can be a digital value indicating the voltage level at the module power input subsystem 110b, etc. The power sense output subsystem 120a is further operable to deliver the power sense subsystem over the second coupling 125.

In some embodiments, the second coupling 125 is a relatively low-current coupling. For example, the second coupling 125 electrically couples dedicated signal pins on each module 105 (e.g., via a ribbon cable or other low-current, signal-type connector). Embodiments of the power sense output subsystem 120a include or are coupled with a current limiter 117. The current limiter 117 is operable to limit current flow over the signal connection via the second coupling 125, for example, in the event of a short to other (e.g., adjacent) signal connections. For example, the current limiter 117 includes a ten to hundred-thousand ohm resistor or the like.

The first module 105a includes a power sense input subsystem 120b for receiving the power sense signal from the second module 105b. Information from the module power output subsystem 110a and from the power sense input subsystem 120b are fed to a fault detection subsystem 140. Embodiments of the fault detection subsystem 140 determine when a difference between the power sourced to the second module 105b and the power received by the second module 105b exceeds some predetermined threshold, indicating a fault condition. When the fault condition is detected, the fault detection subsystem 140 generates a fault detect signal.

In some embodiments, the fault detect signal is used to shut down the system power supply 150 and/or to interrupt supply of power over the high-current coupling 115. Accordingly, the supplied power is interrupted substantially immediately, likely before causing any thermal issues. In one implementation, the fault detect signal is a logical signal that is communicated to a processor or other circuitry of the system power supply 150. The system power supply 150 is designed to shut down substantially immediately upon receiving the signal. In another implementation, the system power supply 150 is hard coded to shut down substantially immediately upon losing standby power. The fault detect signal can be gated with or be otherwise in communication with the standby power, so that the standby power is removed from the power supply when a fault is detected. These and/or other techniques can be used to interrupt the power supplied to the second module substantially immediately upon (e.g., within milliseconds of) detecting the fault, which may be appreciably before interruption would be achieved using other techniques, like thermal detection.

Figure 2:
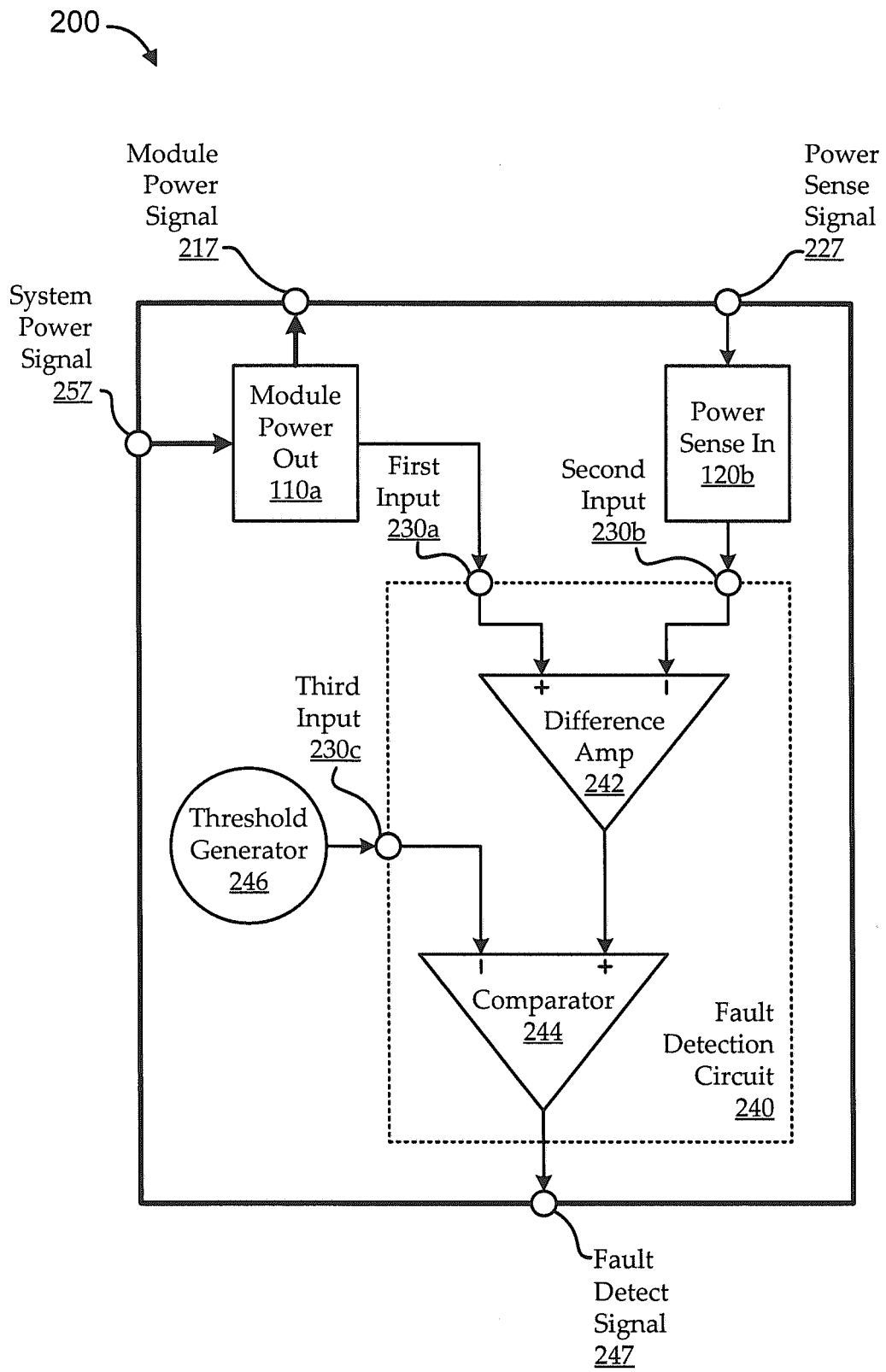
FIG. 2 shows a simplified block diagram of an illustrative fault detection module, according to various embodiments.

FIG. 2 shows a simplified block diagram of an illustrative fault detection module 200, according to various embodiments. The fault detection module 200 may be the first module 105a of FIG. 1. As illustrated, the module 200 includes a module power output subsystem 110a, a power sense input subsystem 120b, and a fault detection circuit 240. The module power output subsystem 110a is designed to generate a first input signal 230a that corresponds to a power level being delivered from the module 200 to a second module (not shown). As described above, the module power output subsystem 110a receives a system power signal 257 (e.g., from a system power supply) and generates a module power signal 217. For example, the module power signal 217 may be substantially identical to the system power signal 257, or it may differ from the system power signal 257 in voltage, current, and/or other characteristics. In one implementation, the first input signal 230a generated by the module power output subsystem 110a is tied directly to the module power signal 217 so as to directly correlate thereto. In other implementations, the first input signal 230a is generated in any suitable manner to provide the fault detection circuit 240 with an indication of one or more characteristics of the module power signal 217 (e.g., its voltage level). For example, the module power output subsystem 110a can generate an analog or digital first input signal 230a that is a function of (e.g., proportional to) the module power signal 217.

The power sense input subsystem 120b is designed to generate a second input signal 230b that corresponds to a power level being received at a second module. As described above, in some embodiments, the second module generates a power sense signal 227 that is communicated to module 200 over a dedicated signal line (e.g., via a low-current coupling). In one implementation, the second input signal 230b is tied directly to the power sense signal 227 so as to directly correlate thereto. In other implementations, the second input signal 230b is generated in any suitable manner to provide the fault detection circuit 240 with an indication of one or more characteristics of the power sense signal 227. Embodiments of the power sense input subsystem 120b generate the second input signal 230b in such a way that the second input signal 230b can be compared by the fault detection circuit 240 with the first input signal 230a generated by the module power output subsystem 110a.

Embodiments of the fault detection circuit 240 are implementations of the fault detection subsystem 140 of FIG. 1. As illustrated, the fault detection circuit 240 includes a difference amplifier 242 and a comparator 244. The difference amplifier 242 receives the first input signal 230a and the second input signal 230b, and outputs a difference level. The difference level output by the difference amplifier 242 indicates a magnitude of difference (e.g., an absolute value of the difference) between the power being supplied from module 200 to a second module and the power actually being received by the second module from module 200. In some implementations, the difference level output by the difference amplifier 242 is the difference in voltage level between the supplied power in the received power. As described above, this difference in voltage level can indicate an undesired voltage drop across a high-current coupling between module 200 and the second module.

In some embodiments, a fault is detected only when the difference level output by the difference amplifier 242 is greater than some predetermined threshold level. Accordingly, embodiments of the module 200 include a threshold generator 246. The threshold generator 246 is designed to generate an appropriate threshold level as a third input signal 230c for use by the fault detection circuit 240 in determining whether a fault condition exists. The generated threshold level may be any suitable level, including, for example, zero volts or some other predetermined voltage level. The threshold level may also be set in any suitable manner, for example, as a voltage level, as a percentage of the voltage level of the module power signal 217, etc. In some embodiments, the threshold generator 246 can be set and/or tuned using one or more analog and/or digital components. In one implementation, the threshold generator 246 includes a set of discrete components selected to generate a predetermined threshold voltage level from the system power signal 257. In another implementation, the threshold generator 246 includes an $I^2C$-based, digitally controlled resistor operable to tune the threshold level as desired. The threshold generator 246 can be implemented as part of, or separate from, the fault detection circuit 240.

To determine whether the difference level output by the difference amplifier 242 is greater than some predetermined threshold level, the difference level and the third input signal 230c are passed to the comparator 244. The comparator 244 generates a fault detect signal 247 as a function of the difference level and the third input signal 230c. In some implementations, when the difference level output by the difference amplifier 242 exceeds the threshold level indicated by the third input signal 230c, the comparator 244 outputs the fault detect signal 247 at a first logical state (e.g., logical '1'), and the comparator 244 outputs the fault detect signal 247 at a second logical state (e.g., logical '0') otherwise. For example, integrity issues in a power interconnect coupling between module 200 and a second module manifest as a voltage drop between the power supplied from the module power output subsystem 110a according to the module power signal 217 and the power received at the second module according to the power sense signal 227 (e.g., as received by the power sense input subsystem 120b). This voltage drop is reflected in the difference level output by the difference amplifier 242. A fault condition is considered to have occurred when the voltage drop exceeds an allowable threshold as set by the threshold generator 246. In this fault condition, the fault detect signal 247 output from the comparator 244 changes state accordingly. As described above, the fault detect signal 247 can be used to shut down power, for example, before the fault condition creates a thermal hazard and/or damage to system components.

While the difference amplifier 242 and the comparator 244 are shown having a particular arrangement of input polarities, the arrangements may be changed without departing from the scope of embodiments. For example, the input polarities of the difference amplifier 242 may be determined according to whether fault monitoring is occurring with respect to a positive power rail, a negative power rail, a ground connection, etc. Similarly, the input polarities of the comparator 244 may be determined according to whether positive or negative logic is being used with the fault detect signal 247.

Embodiments can be used to detect power-side and/or ground-side faults. For example, the power interconnect between modules can include both power distribution and ground distribution. Deficiencies in the integrity of the power interconnect can manifest as an impedance (i.e., thereby causing a voltage difference over the interconnect) on any or all of the power-side and ground-side connections. Similarly, embodiments can be used to detect a change in the expected voltage difference between multiple power-side connections (e.g., for modules configured to receive power at differential power inputs, with a floating ground, etc.). Accordingly, embodiments described with reference to power-side terminology (e.g., "power," "voltage drop," and the like) are intended generally to include ground-side implementations, differential implementations, etc.

Figure 3:
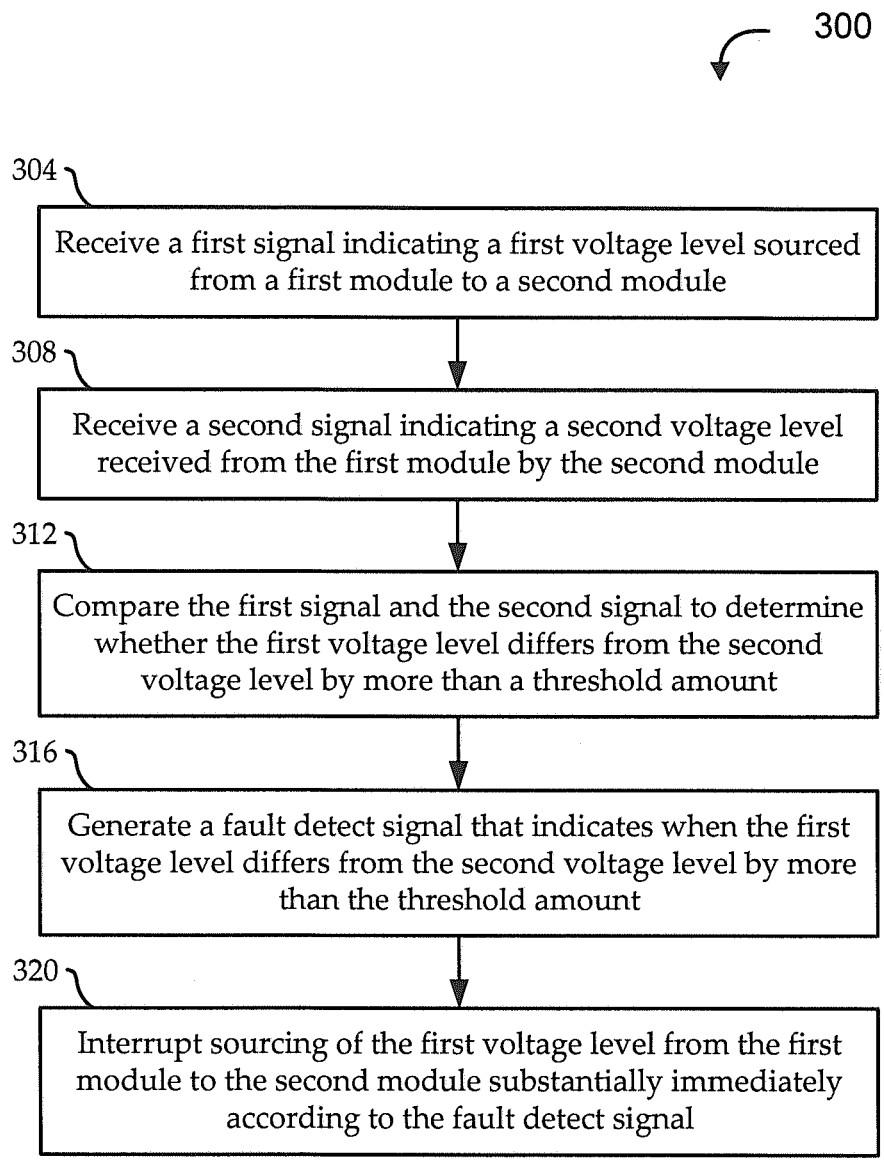
FIG. 3 shows a flow diagram of an illustrative method for power interconnect fault detection, according to various embodiments.

Turning to FIG. 3, a flow diagram is provided of an illustrative method 300 for power interconnect fault detection, according to various embodiments. Embodiments of the method 300 operate in context of a first module that distributes power to at least a second module over a high-current coupling. The method 300 began at stage 304 by receiving a first signal indicating a first voltage level sourced from a first module to a second module. In some implementations, the first signal is the first voltage level. In other implementations, the first signal is generated according to (e.g., as a function of) the first voltage level. For example, the voltage level may be substantially a nominal module power, and the first signal may indicate the nominal module power.

At stage 308, a second signal is received indicating a second voltage level received from the first module by the second module. The second voltage level can be monitored in any suitable location, for example, at the second module side of the high-current coupling. It is assumed that, when there is sufficient integrity in the power interconnect over the high-current coupling, the second voltage level is substantially equivalent to the first voltage level (i.e., there is little or no appreciable voltage drop across the high-current coupling). In some implementations, the second voltage level is monitored at the second module, and a subsystem of the second module generates the second signal. The second signal is sent over a second coupling that is physically separate from the high-current coupling. For example, the second signal is sent as a power sense signal over a dedicated pin of a low-current connector coupled between the first and second modules. Some implementations include current limiting components, for example, to guard against excessive currents from short circuits or other undesirable conditions in the second signal path.

At stage 312, the first signal and the second signal are compared to determine whether the first voltage level differs from the second voltage level in more than a threshold amount. Some implementations calculate a difference between the first signal and the second signal and compare the difference to a predetermined threshold. For example, circuitry is used to generate a difference voltage level corresponding to the difference between the voltage level of the first signal and the voltage level of the second signal, and additional circuitry is used to compare the generated difference voltage level with a threshold voltage level. As described above, a deficiency in the integrity of the power interconnect over the high-current coupling between the first module in the second module can manifest as an impedance that causes a voltage change (e.g., drop) between the supplied voltage and the received voltage at respective ends of the high-current coupling.

While a slight difference may be tolerable (e.g. may not be indicative of a fault), an appreciable voltage difference (e.g., exceeding the predetermined threshold) may be unacceptable and potentially hazardous to system components. Accordingly, at stage 316, a fault detect signal is generated that indicates when the first voltage level differs from the second voltage level by more than the threshold amount. In one implementation, logic circuitry is used to generate a logical value as a function of comparing the difference in sourced and received voltage levels (e.g., as indicated by the first and second signals) with a threshold voltage level. For example, the logic circuitry outputs a logical HIGH when the difference between the sourced and received power levels exceed the predetermined threshold amount, and the logic circuitry outputs a logical LOW otherwise.

At stage 320 sourcing of the first voltage level from the first module to the second module is interrupted substantially immediately according to the fault detect signal. For example, the fault detect signal is fed to a system power supply, and the system power supply is operable to shut down within milliseconds of receiving the indication the of the fault detect signal that an excessive voltage drop has been detected over the high-current coupling. Alternatively, the fault detect signal is fed back to a subsystem of the first module that is supplying power to the second module, in the subsystem is operable to shut down substantially immediately upon receiving a fault indication the of the fault detect signal.

In some embodiments, additional functionality is included. For example, in one implementation, a detected fault is indicated and/or logged in a manner that is suitable for debugging, maintenance, etc. In another implementation, and novel techniques described herein are combined with other techniques (e.g., thermal detection) for additional and/or redundant protection of system components. For example, when a fault is detected, it may be further desirable to determine whether a thermal hazard is already present and, if so, to power on the cooling system (e.g., a fan).

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system disposed on a first circuit board of a computer system for detecting a power interconnect fault between the first circuit board and a second circuit board of the computer system, the system comprising:
    a module power output subsystem operable to provide a sourced power level from the first circuit board to the second circuit board via a board power interconnect coupling between the first circuit board and the second circuit board;
    a sense input port operable to receive a power sense signal from the second circuit board via a signal coupling that is physically separate from the board power interconnect coupling, the power sense signal indicating a received power level being received from the first circuit board by the second circuit board via the board power interconnect coupling; and
    a fault detection subsystem operable to generate a fault detect signal that indicates whether a difference between the sourced power level and the received power level is greater than a predetermined threshold level,
    wherein sourcing by the module power output subsystem of the module power from the first circuit board to the second circuit board via the board power interconnect coupling is interrupted substantially immediately upon receiving an indication via the fault detect signal that the difference between the sourced power level and the received power level is greater than the predetermined threshold level.

2. The system of claim 1, wherein the fault detection subsystem comprises:
    a difference amplifier operable to output a difference level as a function of the difference between the sourced power level and the received power level; and
    a comparator operable to output the fault detect signal as a function of the difference level and the predetermined threshold level, so that the fault detect signal manifests a first logical value when the difference level exceeds the predetermined threshold level and manifests a second logical value otherwise.

3. The system of claim 1, wherein the fault detection subsystem is operable to generate the fault detect signal by:
    receiving a first voltage level corresponding to the sourced power level;
    receiving a second voltage level corresponding to the power sense signal;
    receiving a third voltage level corresponding to the predetermined reference level; and
    generating a difference level as a function of the difference between the first voltage level and the second voltage level; and
    generating the fault detect signal as a function of the difference level and the third voltage level.

4. The system of claim 3, wherein:
    the first voltage level is the sourced power level; and
    the second voltage level is the received power level.

5. The system of claim 3, wherein the first voltage level is a second reference level.

6. The system of claim 1, further comprising:
    a power sense subsystem operable to generate the power sense signal and to deliver the power sense signal to the first module via the signal coupling.

7. The system of claim 6, wherein:
    the module power output subsystem is operable to provide the sourced power at a relatively high current; and
    the power sense subsystem further comprises a current limiter operable to ensure delivery of the power sense signal to the first circuit board via the signal coupling at a relatively low current.

8. The system of claim 1, wherein:
    the module power output subsystem is operable to provide the sourced power level substantially at a nominal ground level.

9. The system of claim 1, further comprising:
    a system power supply operable to supply system power, wherein the module power output subsystem is further operable to convert the system power into the sourced power level.

10. The system of claim 9, further comprising:
    a system power control subsystem in communication with the fault detection subsystem and operable to shut down the supply of the system power by the system power supply substantially immediately upon receiving an indication via the fault detect signal that the difference between the sourced power level and the received power level is greater than the predetermined threshold level.

11. The system of claim 1, wherein the first circuit board is a main processor board of a server system, the second circuit board is a mezzanine board of the server system, and the board power interconnect coupling is a mezannine-type coupling.

12. The system of claim 1, wherein the predetermined threshold level is set by at least one programmable component.

13. A method for detecting a power interconnect fault, the method comprising:
    determining a first power level being sourced from a first circuit board of a computer system to a second circuit board of the computer system via a board power interconnect coupling;
    monitoring, over a signal coupling that is physically separate from the board power interconnect coupling, a second power level being received from the first circuit board by the second circuit board via the board power interconnect coupling; and generating a fault detect signal operable to interrupt sourcing of the first power level from the first circuit board to the second circuit board via the board power interconnect coupling substantially immediately upon determining that a difference between the first power level and the second power level is greater than a predetermined threshold level.

14. The method of claim 13, wherein generating the fault detect signal comprises:
generating a difference level as a function of the difference between the first power level and the second power level; and
generating the fault detect signal as a function of the difference level and the predetermined threshold level, so that the fault detect signal manifests a first logical value when the difference level exceeds the predetermined threshold level and manifests a second logical value otherwise.

15. The method of claim 13, wherein generating the fault detect signal comprises:
receiving a first voltage level corresponding to the first power level;
receiving a second voltage level corresponding to the second power level;
receiving a third voltage level corresponding to the predetermined reference level; and
generating a difference level as a function of the difference between the first voltage level and the second voltage level; and
generating the fault detect signal as a function of the difference level and the third voltage level.

16. The method of claim 13, further comprising:
receiving a power sense signal corresponding to the second power level.

17. The method of claim 13, further comprising:
receiving, via the fault detect signal, an indication that the difference between the first power level and the second power level is greater than the predetermined threshold level; and interrupting sourcing of the first power level from the first circuit board to the second circuit board via the board power interconnect coupling substantially immediately upon receiving the indication.

18. A method for detecting a power interconnect fault, the method comprising:
coupling a first circuit board with a second circuit board via a board power interconnect coupling;
coupling the first circuit board with the second circuit board via a signal coupling that is physically separate from the board power interconnect coupling;
sourcing a first power level at a high current from the first circuit board to the second circuit board via the board power interconnect coupling;
monitoring, via the signal coupling at a low current, a second power level being received from the first circuit board by the second circuit board via the board power interconnect coupling; and
interrupting sourcing the first power level at the high current from the first circuit board to the second circuit board via the board power interconnect coupling substantially immediately upon determining that a difference between the first power level and the second power level is greater than a predetermined threshold level.

19. The method of claim 18, wherein the interrupting step comprises:
generating a difference level corresponding to the difference between the first power level and the second power level; and
generating a fault detect signal indicating whether the difference is greater than the predetermined threshold level,
wherein the sourcing of the first power level at the high current is interrupted substantially immediately upon determining, according to the fault detect signal, that the difference is greater than the predetermined threshold level.

20. The method of claim 18, wherein monitoring the second power level comprises:
receiving a power sense signal via the signal coupling corresponding to the second power level.

* * * * *